United States Patent
Oklejas, Jr.

(10) Patent No.: US 6,797,173 B1
(45) Date of Patent: Sep. 28, 2004

(54) METHOD AND APPARATUS FOR MEMBRANE RECIRCULATION AND CONCENTRATE ENERGY RECOVERY IN A REVERSE OSMOSIS SYSTEM

(76) Inventor: Eli Oklejas, Jr., 444 Ave. De Lafayette, Monroe, MI (US) 48162

( * ) Notice: Subject to any disclaimer, the term of this patent is extended or adjusted under 35 U.S.C. 154(b) by 351 days.

(21) Appl. No.: 09/702,469

(22) Filed: Oct. 31, 2000

Related U.S. Application Data
(60) Provisional application No. 60/163,042, filed on Nov. 2, 1999.

(51) Int. Cl.$^7$ .............................................. B01D 61/00
(52) U.S. Cl. ................. 210/652; 210/195.2; 210/257.2; 210/321.72; 210/416.1; 417/365; 417/406
(58) Field of Search ........................... 210/652, 321.66, 210/416.1, 195.2, 257.2, 137, 321.72; 417/365, 405

(56) References Cited

U.S. PATENT DOCUMENTS

| | | | |
|---|---|---|---|
| 4,187,173 A | 2/1980 | Keefer | |
| 4,230,564 A | 10/1980 | Keefer | |
| 4,243,523 A * | 1/1981 | Pelmulder | 210/652 |
| 4,255,081 A | 3/1981 | Oklejas et al. | |
| 4,432,876 A | 2/1984 | Keefer | |
| 4,702,842 A * | 10/1987 | Lapierre | |
| 4,830,572 A | 5/1989 | Oklejas Jr. et al. | |
| 4,966,708 A | 10/1990 | Oklejas et al. | |
| 4,973,408 A | 11/1990 | Keefer | |
| 4,983,305 A | 1/1991 | Oklejas et al. | |
| 5,049,045 A | 9/1991 | Oklejas et al. | |
| 5,082,428 A | 1/1992 | Oklejas et al. | |
| 5,106,262 A | 4/1992 | Oklejas et al. | |
| 5,320,755 A * | 6/1994 | Hagqvist et al. | 210/652 |
| 5,819,524 A | 10/1998 | Bosley et al. | |
| 5,951,169 A | 9/1999 | Oklejas et al. | |
| 5,980,114 A | 11/1999 | Oklejas, Jr. | |
| 6,017,200 A * | 1/2000 | Childs et al. | |
| 6,036,435 A | 3/2000 | Oklejas | |
| 6,110,375 A * | 8/2000 | Bacchus et al. | 210/652 |
| 6,139,740 A * | 10/2000 | Oklijas | |
| 6,187,200 B1 * | 2/2001 | Yamamura et al. | |
| 6,190,556 B1 * | 2/2001 | Uhlinger | |
| 6,345,961 B1 * | 2/2002 | Oklijas, Jr. | |
| 6,468,431 B1 * | 10/2002 | Oklejas, Jr. | |

* cited by examiner

Primary Examiner—Ana Fortuna
(74) Attorney, Agent, or Firm—Kevin G. Mierzwa

(57) ABSTRACT

An apparatus and method suitable for use in a reverse osmosis system has a process chamber having a feed inlet, a low pressure outlet and a high pressure outlet. A feed pump is used to increase the feed pressure to process the process chamber. A common shaft having rotatably coupled thereto a booster pump fluidically coupled between the feed pump and the feed inlet and an energy recovery turbine fluidically coupled to the high pressure concentrate outlet. The energy recovery turbine drives the booster pump.

19 Claims, 2 Drawing Sheets

METHOD AND APPARATUS FOR MEMBRANE RECIRCULATION AND CONCENTRATE ENERGY RECOVERY IN A REVERSE OSMOSIS SYSTEM

This application claims the benefit of Provisional application Ser. No. 60/136,042, filed Nov. 2, 1999.

RELATED APPLICATIONS

The present application relates to U.S. patent application Ser. No. 09/491,769 entitled "Hydraulic Energy Recovery Device" filed Jan. 26, 2000, and U.S. patent application (Attorney Docket No OKL-0118PA) entitled "Method And Apparatus for Boosting Interstage Pressure In A Reverse Osmosis System", each of which are hereby incorporated by reference.

TECHNICAL FIELD

The present invention relates generally to a reverse osmosis systems suitable for desalinization of water, and more specifically, to a recirculation system and concentrate energy recovery in a reverse osmosis system.

BACKGROUND OF THE INVENTION

Reverse osmosis (RO) is a process widely used for desalinization of water. Reverse osmosis membranes are contained in a process chamber into which pressurized feedwater is admitted. A portion of the pressurized water permeates across the membrane and exits the process chamber as purified water at a low pressure and is referred to as permeate. The remainder of the water, still at high pressure, exits the process chamber and is referred to as a concentrate.

During the life of a membrane the fluid pressure must be adjusted slightly to ensure optimum operation. Without such optimization, the system becomes inefficient. It some systems it is often necessary to recirculate a portion of the concentrate through the same membrane to obtain a desirable flow velocity within the membrane for optimal performance.

Referring now to FIG. 1, a known reverse osmosis system 10 is illustrated having a feed pump 12 which is driven by a motor 14 to pressurize feed fluid from a feed input 16. Pressurized fluid leaves pump 12 through an output 18, travels through a valve 19 and enters a first reverse osmosis process chamber 20. The process chamber 20 has a permeate header 22 through which permeate is removed from the reverse osmosis chamber 20. Reverse osmosis chamber 20 also has a concentrate output 24 which removes concentrate from the reverse osmosis chamber 20 at a high pressure. The concentrate output 24 is coupled to a valve 26 through which a portion of the concentrate enters the feed stream upstream of feed pump 12. The remaining concentrate passes through valve 28.

One problem with devices such as those illustrated in FIG. 1 is that they are very inefficient. The concentrate pressure is typically about 30 psi less than the pressure entering reverse osmosis chamber 20. The feed pressure, however, may approach, for example, 1000 psi or higher. Thus, the flow passing through control valve 26 undergoes a substantial pressure reduction from about 970 psi to about 30 psi in the present example. Thus, feed pump 12 must pressurize the recirculation flow as well as the feed flow.

Another known arrangement similar to FIG. 1 is illustrated having the same components illustrated with the same reference numerals. In this embodiment, a pump 30 driven by a motor 32 couples concentrate at an elevated pressure above that of the feed stream.

One problem with these types of systems is that although they are more energy efficient than other known systems, energy dissipated in control valve 28 cannot be recovered. Another drawback to this type of system is that recirculation pump 30 is expensive because of the high working pressure. Another drawback to the system is that the motor 32 consumes a substantial amount of energy.

SUMMARY OF THE INVENTION

It is therefore one object of the invention to provide a reverse osmosis system that uses concentrate recirculation to allow the membrane to operate efficiently while recovering otherwise wasted energy.

In one aspect of the invention a process chamber preferably a reverse osmosis chamber, has a feed inlet, a low pressure outlet, and a high pressure outlet. A feed pump is used to increase the pressure of feed fluid to feed inlet.

A common shaft is used to rotatably couple a booster and an energy recovery turbine together. The energy recovery turbine is fluidically coupled to the high pressure outlet to drive the booster pump. The booster pump is positioned between the feed pump and process chamber and increases the pressure of feed fluid.

In a further aspect of the invention, a method for operating a reverse osmosis system comprises the steps of:
 boosting a pressure of fluid output from a feed pump prior to entering to a first process chamber using from a first portion of a high pressure fluid from a high pressure outlet of a first process chamber;
 recirculating a second portion of the high pressure fluid; and
 fluidically coupling the second portion of the high pressure fluid between the feed pump and the process chamber.

One advantage of the present invention is that energy-wasting throttle valves and bypass lines have been eliminated from the reverse osmosis process. Another advantage of the invention is that more energy is recovered from the process lowering the overall cost of operating such a process. Another advantage is that the components can be combined into a single package.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

In the following figures, the same references numerals will be used to identify identical components in the various views.

The present invention is described with respect to various preferred embodiments and preferred system uses. One skilled in the art would recognize various alternatives without varying from the spirit of the invention such as nondesalinization reverse osmosis systems.

Figure 1:
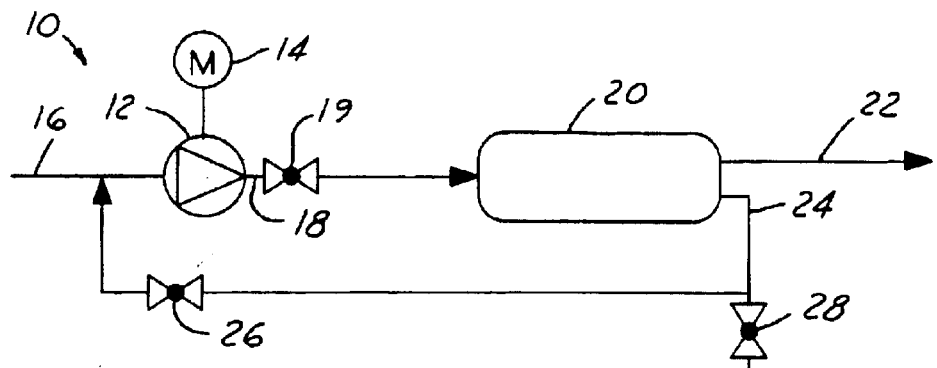
FIG. 1 is a schematic view of a first known reverse osmosis system of the prior art.
Figure 2:
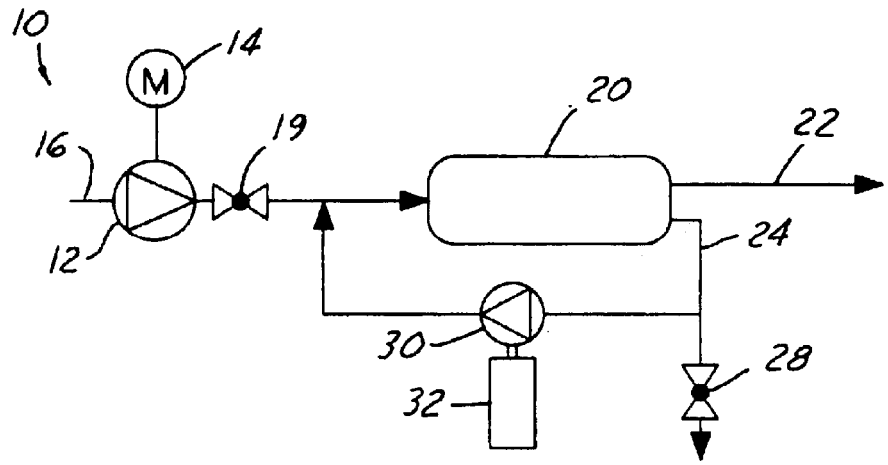
FIG. 2 is a schematic view of a second known reverse osmosis system of the prior art.
Figure 3:
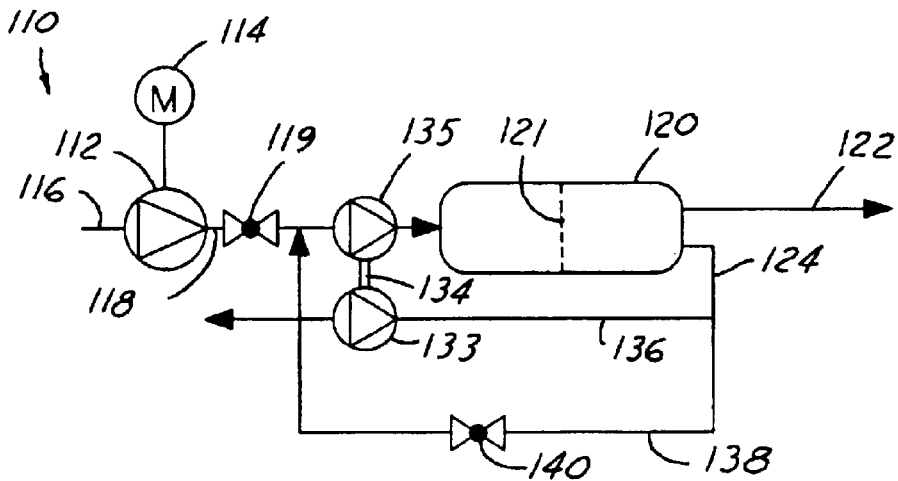
FIG. 3 is a schematic view of a first embodiment of a reverse osmosis system according to the present invention.

Referring now to FIG. 3, an improved embodiment similar to that shown in FIG. 1 is illustrated with the same components having the same reference numerals from FIG. 1 increased by 100.

An improved reverse osmosis system 110 is illustrated having a feed pump 112 which is driven by a motor 114 to pressurize feed fluid from a feed input 116. Pressurized feed fluid leaves pump 112 through an output 118, travels through a valve 119 and enters a first reverse osmosis process chamber 120. The first reverse osmosis process chamber 120 has a membrane 121 therein for filtering feed fluid. The process chamber 120 has a permeate header 122 through which low pressure permeate that has passed through the membrane 121 is removed from the reverse osmosis chamber 120. Reverse osmosis chamber 120 also has a concentrate output 124 which removes concentrate from the reverse osmosis chamber 120 at a high pressure. The concentrate output 124 in this case has two paths; a first channel 136 and a second channel 138. A portion of the concentrate flows into each channel 136, 138.

First channel 136 directs a portion of concentrate in series through an energy recovery turbine 133 that is coupled to a common shaft 134 and a booster pump 135. Booster pump 135 is therefore driven by concentrate flow through channel 136 which drives turbine 133. The output of turbine 133 is concentrate with a substantial portion of the energy (preferably substantially all) contained therein removed.

Second channel 138 has a control valve 140 coupled in series herein to control the flow of concentrate through channel 136 and 138. Second channel 138 after control valve 140 directs concentrate between feed pump 112 and process chamber 120. In this embodiment, concentrate is preferably directed between feed pump 112 and booster pump 135.

Figure 4:
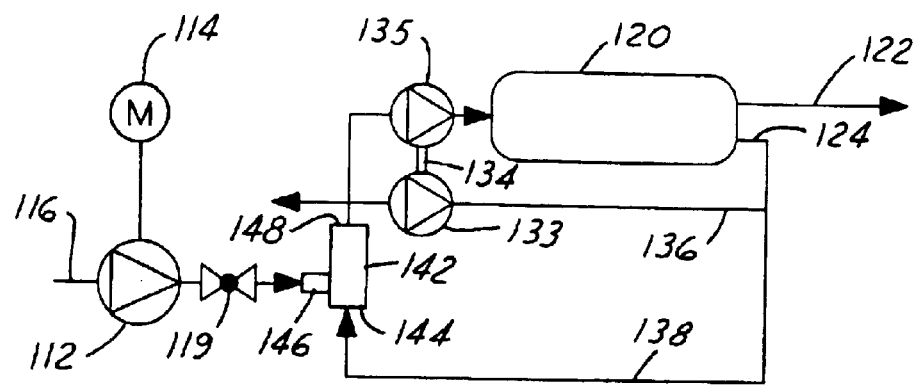
FIG. 4 is a schematic view of a second embodiment of a reverse osmosis system according to the present invention.
Figure 6:
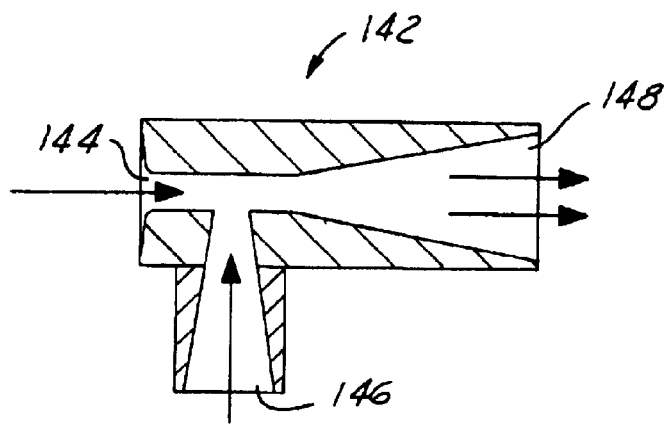
FIG. 6 is a cross sectional view of a jet pump of FIGS. 4 and 5.

Another known arrangement similar to FIG. 1 is illustrated in FIG. 4 also with reference to FIG. 6 having the same components of FIG. 3 illustrated with the same reference numerals. In this embodiment, first channel 136 is configured in a similar manner to that of FIG. 3. Channel 138, however, is configured differently than that of FIG. 3 by inserting a jet pump 142 therein. Jet pump 142 is positioned between feed pump 112 and process chamber 120. In this embodiment, jet pump 142 is preferably positioned between feed pump 112 and booster pump 135, and more specifically between control valve 119 and booster pump 135. Jet pump 142 has a driving fluid input 144 coupled to concentrate output 124. Thus, the driving fluid of jet pump 142 is the recirculating flow whereas the pumped fluid is the feed flow from feed pump 112. By eliminating the control valve 140 from FIG. 3, a portion of the energy that would have been lost is used to pressurize the combined feed and recirculation flow. Jet pump 142 has a pumped fluid input 146 used to receive feed fluid from feed pump 112. Jet pump 142 has a jet pump output 148 that directs fluid to booster pump 135.

Figure 5:
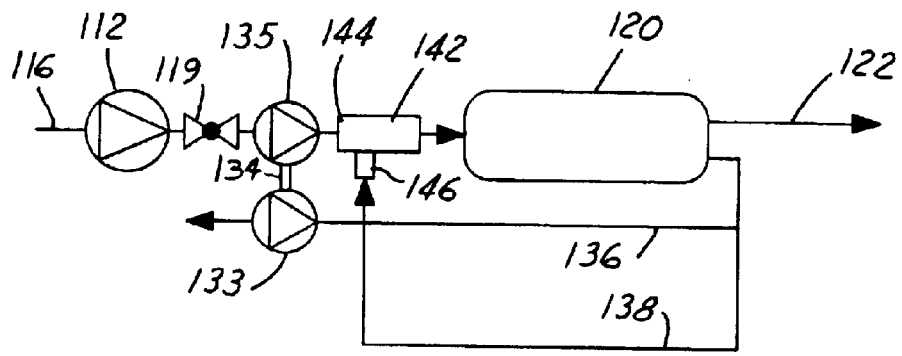
FIG. 5 is a schematic view of a third embodiment of a reverse osmosis system according to the present invention.

Referring now to FIG. 5, a similar arrangement to that of FIG. 4 is illustrated using the same reference numerals for the same components of FIG. 4. In this embodiment, jet pump 142 is positioned between booster pump 135 and process chamber 120. In this embodiment, however, the position of jet pump 142 is such that driving fluid input 144 is coupled to the output of booster pump 135 and the pressure of recirculating concentrate at pumped fluid input 146 is increased. In this embodiment, the most efficient arrangement depends on the ratio of feed flow to the recirculating flow. Generally, jet pump 142 is more efficient when the driving flow exceeds the pumped flow.

In operation, each of the embodiments of the present invention harnesses the energy from the concentrate output of the process chamber through two output channels. The first channel 136 is used to power an energy recovery turbine 133 to increase the pressure of the feed fluid into process chamber 120. The second channel 138 is used to provide recirculation to process chamber 120 between feed pump 112 and process chamber 120. In the first embodiment, the second channel is coupled directly to the feed flow after feed pump 112 but before booster pump 135. Thus, the concentrate is recirculated through booster pump 135 and into process chamber 120 to obtain a predetermined velocity. In the second and third embodiments, a jet pump is used to further increase and harness the energy from the second channel 138. In the second embodiment, the pump fluid is the fluid from feed pump 112. In the third embodiment, the pump fluid is the concentrate.

While particular embodiments of the invention have been shown and described, numerous variations and alternate embodiments will occur to those skilled in the art. Accordingly, it is intended that the invention be limited only in terms of the appended claims.

What is claimed is:

1. A system comprising:
   a process chamber having a membrane, a feed inlet, a low pressure outlet and a high pressure outlet;
   a feed pump;
   a common shaft having rotatably coupled thereto a booster pump fluidically coupled between said feed pump and said feed inlet and an energy recovery turbine fluidically coupled to said high pressure outlet through a first channel, said energy recovery turbine drives said booster pump; and
   a second channel fluidically coupling an input of said process chamber and said high pressure outlet.

2. A system as recited in claim 1 wherein said process chamber has a first reverse osmosis membrane therein.

3. A system as recited in claim 1 wherein said low pressure outlet comprises a permeate outlet.

4. A system as recited in claim 1 wherein said high pressure outlet comprises a concentrate outlet.

5. A system as recited in claim 1 further comprising a first control valve coupled between said booster pump and said feed pump.

6. A system as recited in claim 1 further comprising a second control valve coupled within said second channel and directing concentrate between said feed pump and said booster pump.

7. A system as recited in claim 1 further comprising a jet pump fluidically coupled to the second channel to couple the high pressure outlet to said feed pump outlet.

8. A system as recited in claim 7 wherein said jet pump is coupled between said feed pump and said booster pump.

9. A system as recited in claim 8 wherein said jet pump is coupled between said booster pump and said process chamber.

10. A reverse osmosis system comprising:
    a reverse osmosis process chamber having a membrane, a first feed inlet, a first permeate outlet and a first concentrate outlet;
    a feed pump;
    a common shaft having rotatably coupled thereto a booster pump fluidically coupled between said feed pump and said first feed inlet and an energy recovery turbine fluidically coupled to said first concentrate outlet through a first channel, said energy recovery turbine driving said booster pump; and a second channel coupled to said first concentrate outlet for directing a portion of said concentrate between said booster pump and said feed inlet.

11. A system as recited in claim 10 wherein said second channel directs concentrate between said feed pump and said energy recovery turbine.

12. A system as recited in claim 10 wherein said second channel directs said concentrate between said energy recovery turbine and said process chamber.

13. A system as recited in claim 10 further comprising a jet pump coupling said second channel to said feed pump outlet.

14. A system as recited in claim 13 wherein said jet pump is coupled between said feed pump and said booster pump.

15. A system as recited in claim 13 wherein said jet pump is coupled between said booster pump and said process chamber.

16. A method of operating a process having a feed pump directing fluid to a process chamber having a membrane, a high pressure outlet and a low pressure outlet comprising the steps of;

boosting a pressure of fluid output from a feed pump prior to entering to a first process chamber using a first portion of a high pressure fluid from a high pressure outlet of a first process chamber using an energy recovery turbine coupled to a pump on a common shaft, said first portion of high pressure fluid turning the turbine;

recirculating a second portion of the high pressure fluid; and fluidically coupling the second portion of the high pressure fluid between the feed pump and the process chamber.

17. A method as recited in claim 16 wherein the pump comprises a jet pump.

18. A method as recited in claim 17, further comprising the steps of fluidically coupling a pumped fluid input of the jet pump to the second portion of high pressure fluid and fluidically coupling a driving fluid input to fluid output from the feed pump.

19. A method as recited in claim 16 further comprising the steps of fluidically coupling a pumped fluid input of the jet pump to fluid output from the feed pump and fluidically coupling a driving fluid input to the second portion of high pressure fluid.

* * * * *